US009082084B2

(12) United States Patent
Ogilvie et al.

(10) Patent No.: US 9,082,084 B2
(45) Date of Patent: Jul. 14, 2015

(54) FACILITATING MACHINE LEARNING IN AN ONLINE SOCIAL NETWORK

(71) Applicant: LinkedIn Corporation, Mountain View, CA (US)

(72) Inventors: Paul T. Ogilvie, Palo Alto, CA (US); Xiangrui Meng, Menlo Park, CA (US); Anmol Bhasin, Los Altos, CA (US); Trevor A. Walker, San Francisco, CA (US)

(73) Assignee: LinkedIn Corporation, Mountain View, CA (US)

( * ) Notice: Subject to any disclaimer, the term of this patent is extended or adjusted under 35 U.S.C. 154(b) by 24 days.

(21) Appl. No.: 13/931,109

(22) Filed: Jun. 28, 2013

(65) Prior Publication Data

US 2015/0006442 A1     Jan. 1, 2015

(51) Int. Cl.
   *G06N 99/00*     (2010.01)
   *G06Q 50/00*     (2012.01)

(52) U.S. Cl.
CPC .............. *G06N 99/005* (2013.01); *G06Q 50/01* (2013.01)

(58) Field of Classification Search
CPC .................................................... G06N 99/005
USPC ...................................................... 706/12, 62
See application file for complete search history.

(56) References Cited

U.S. PATENT DOCUMENTS

2013/0031034 A1*    1/2013   Gubin et al. .................... 706/12

OTHER PUBLICATIONS

M. Forster, "Key concepts in model selection: Performance and generalizability", Journal of mathematical psychology 44.1 (2000), pp. 205-231.*
S. Arlot and A. Celisse, "A survey of cross-validation procedures for model selection", Statistics Surveys, vol. 4, 2010, pp. 40-79.*
W. Fan et al., "Discovering and reconciling value conflicts for numerical data integration", Info. Sys., vol. 26, 2001, pp. 635-656.*
Xiangrui Meng: "Scalable Simple Random Sampling and Stratified Sampling", Proceedings of the 30th International Conference on Machine Learning, Atlanta Georgia, USA, 2013, JMLR: W&CP vol. 28, copyright 2013 by the author.

* cited by examiner

*Primary Examiner* — Kakali Chaki
*Assistant Examiner* — Vincent Gonzales
(74) *Attorney, Agent, or Firm* — Park, Vaughan, Fleming & Dowler LLP

(57) ABSTRACT

Automatic machine-learning processes and systems for an online social network are described. During operation of the online social network, a system can automatically collect labeled training events, obtain snapshots of raw entity data associated with subjects from the collected training events, produce training examples by generating features for each training event using the snapshots of entity data and current entity data, and split the training examples into a training set and a test set. Next, the system can use a machine-learning technique to train a set of models and to select the best model based on one or more evaluation metrics using the training set. The system can then evaluate the performance of the best model on the test set. If the performance of the best model satisfies a performance criterion, the system can use the best model to predict responses for the online social network.

23 Claims, 4 Drawing Sheets

FACILITATING MACHINE LEARNING IN AN ONLINE SOCIAL NETWORK

RELATED ART

The disclosed embodiments generally relate to techniques for optimizing the performance of online social networks. More specifically, the disclosed embodiments relate to a system and a method for facilitating automated machine-learning operations to optimize the performance of an online social network.

BACKGROUND

Perhaps the most significant development on the Internet in recent years has been the rapid proliferation of online social networks, such as LinkedIn® and Facebook®. Billions of users are presently accessing such social networks to connect with friends and acquaintances and to share personal and professional information. During operation, such online social networks make millions of decisions each day, for example to determine which news articles will be interesting to specific users, to determine whether user comments constitute spam, or to determine which types of subscription offers to present to a given user. The quality of these decisions directly affects user satisfaction and subscription revenue, and is therefore critically important to the success of an online social network.

However, designing a system to make good decisions can be a challenging task because a user's preferences and associated behavior can change over time. Moreover, an online social network makes decisions for a wide variety of different purposes. Hence, it is desirable for the same decision-making methodology to be easily adaptable for these different purposes.

DESCRIPTION

Figure 1:
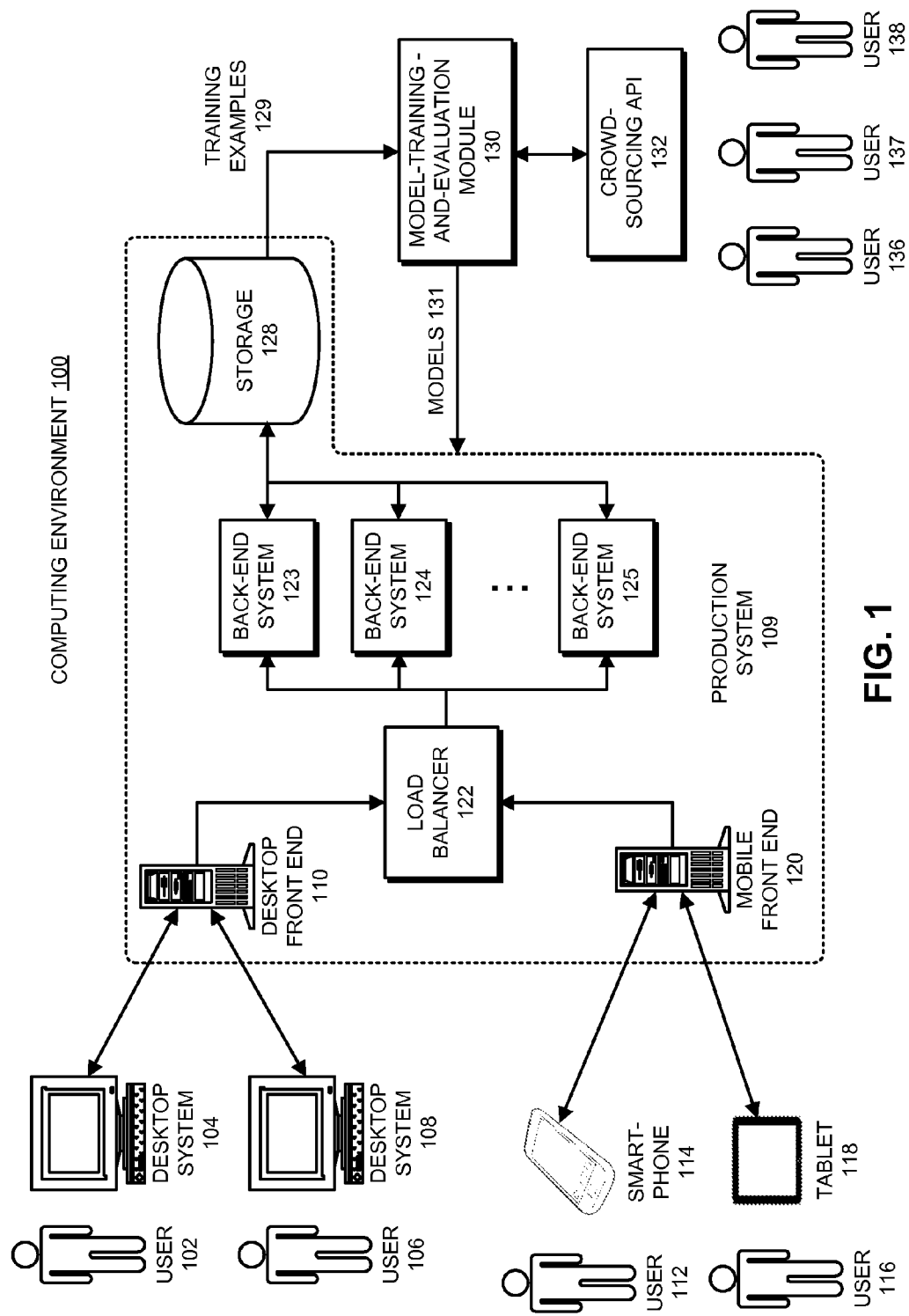
FIG. 1 illustrates a computing environment in accordance with the disclosed embodiments.

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a system reads and executes the code and/or data stored on the non-transitory computer-readable storage medium, the system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments relate to a system that facilitates an automatic machine-learning process for an online social network. During operation of the online social network, the system automatically collects labeled training events, and also obtains snapshots of raw entity data associated with subjects from the collected training events. (This raw entity data enables the system to easily re-train models in the future with accurate feature values.) Next, the system generates features for each training event using the snapshots of entity data and current entity data to produce training examples. The system then splits the training examples into a training set and a test set. Next, the system uses a machine-learning technique to train a set of models and to select the best model based on one or more evaluation metrics using the training set. The system then evaluates the performance of the best model on the test set. If the performance of the best model satisfies a performance criterion, the system uses the best model to predict responses for the online social network.

In some embodiments, the system repeats this process to continually update a model that predicts responses for the online social network.

In some embodiments, evaluating the performance of the best model involves using a crowd-sourcing evaluation technique, which selects training examples from the test set and compares predictions of the best model with predictions of humans on the selected training examples. The system can also use a crowd-sourcing evaluation technique to refine models.

The above-described technique is described in more detail below, but first we describe an exemplary system that uses the technique.

Computing Environment

FIG. 1 illustrates an exemplary computing environment 100 for a specific type of online social network called an "online professional network" (such as LinkedIn®), which is designed to facilitate professional contacts for business purposes. However, the described techniques are not meant to be limited to an online professional network, and can generally be applied to any online social network or similar system that provides services for members. As illustrated in FIG. 1, the online professional network can be accessed through browsers in desktop systems (104 and 108) that interact with a website for the online professional network. Alternatively, the online professional network can be accessed through mobile applications that act as gateways to an online professional network from associated mobile devices, including a smartphone 114 and a tablet computer 118.

More specifically, desktop systems 104 and 108 include browsers (not shown) which are operated by users 102 and 106, respectively. (Note that the terms "user" and "member" are used interchangeably throughout this specification and the attached claims.) Also note that desktop systems 104 and 108 can generally include any type of computer system that can interact with the online professional network through a browser. For example, desktop systems 104 and 108 can include a personal computer system, a server computer system, or even a laptop computer system. During operation, browsers in desktop systems 104 and 108 interact with a desktop front end 110, wherein desktop front end 110 provides services that make requests to various back-end systems 123-125 as is described in more detail below. Although only one desktop front end 110 is illustrated in FIG. 1, in general computing environment 100 can include a large number of desktop front ends. This enables the online professional network to simultaneously interact with thousands or even millions of users.

Mobile devices 114 and 118, which are operated by users 112 and 116, respectively, can generally include any type of portable electronic device that can interact with the online professional network through a mobile application. For example, these portable electronic devices can include a smartphone, a tablet computer, a network-connected music player, a gaming console and possibly a laptop computer system.

As mentioned above, mobile devices 114 and 118 execute mobile applications that function as portals to the online professional network. Although the illustrated embodiment shows only two mobile devices 114 and 118, in general computing environment 100 can include a large number of mobile devices and associated mobile application instances (possibly thousands or millions) that simultaneously access the online professional network.

These mobile applications interact with the online professional network through mobile front end 120, wherein mobile front end 120 includes services that make requests to various back-end systems 123-125 as is described in more detail below. Computing environment 100 can generally include a large number of mobile front-end systems, and is not limited to a single mobile front-end system 120 as is illustrated in FIG. 1. Moreover, mobile devices 114 and 118 communicate with mobile front end 120 through one or more networks (not shown), such as a Wi-Fi® network, a Bluetooth® network or a cellular data network.

During operation, users 102 and 106 of desktop systems 104 and 108, respectively, perform various actions while interacting with the online professional network through a browser-based interface. For example, these actions can include: browsing the user's home page, sending an email message to another user, editing the user's personal profile page, or searching for a specific user. These actions cause services in desktop front end 110 to generate requests, which are sent to back-end systems 123-125 through load balancer 122.

Similarly, users 112 and 116 of portable electronic devices 114 and 118, respectively, perform various actions while interacting with the online professional network through associated mobile applications. These actions cause services in mobile front end 120 to generate requests, which are sent to back-end systems 123-125 through load balancer 122.

Requests from desktop front end 110 and mobile front end 120 are sent to load balancer 122, which decides which back-end system 123-125 will receive each request. This decision can be based on a number of factors, including the load on each back-end system 123-125 and the priority of each request relative to other requests. For example, if a particular back-end system 123 is lightly loaded and other back-end systems 124 and 125 are more heavily loaded, load balancer 122 can decide to send the next request to back-end system 123.

The relative priority of requests can also affect how load balancer 122 directs requests. Some requests are relatively low priority, such as requests associated with background tasks that perform data-mining operations, whereas other requests are higher priority, such as a request to load a home page for a waiting user. Load balancer 122 can direct higher priority tasks to lightly loaded back-end systems, and can ensure that these back-end systems, which are running the higher priority tasks, remain lightly loaded. Conversely, load balancer 122 can direct lower-priority tasks to more highly loaded back-end systems, which are processing other lower-priority tasks.

During operation, back-end systems 123-125 service requests received from load balancer 122, which can involve reading from and writing to non-volatile storage device 128, such as disk drives or solid-state storage.

During operation, the system illustrated in FIG. 1 runs a model-training-and-evaluation module 130, which uses machine-learning techniques to train models that make predictions for online social networks. For example, model-training-and-evaluation module 130 can train a model, which is sent to production system 109 to recognize user comments that constitute spam. This enables the online professional network to filter out such comments, before the comments are displayed by the online professional network.

During operation, model-training-and-evaluation module 130 collects training examples 129 from storage system 128, wherein the training examples 129 include various features that can be used to determine a specific response to be predicted. Next, model-training-and-evaluation module 130 uses training examples 129 to train and evaluate one or more models 131 that can be pushed to production system 109 to make decisions for production system 109.

While evaluating a model, a crowdsourcing module (not illustrated) within model-training-and-evaluation module 130 can send selected training examples and associated responses produced by the model to crowd-sourcing application programming interface (API) 132. This enables model-training-and-evaluation module 130 to solicit opinions of a number of users 136-138 (possibly hundreds of thousands of users) about the accuracy of the responses.

The operation of model-training-and-evaluation module 130 is described in more detail below with reference to FIGS. 3-5, but first we describe the general structure of a decision-making model.

Decision-Making Model

Figure 2:
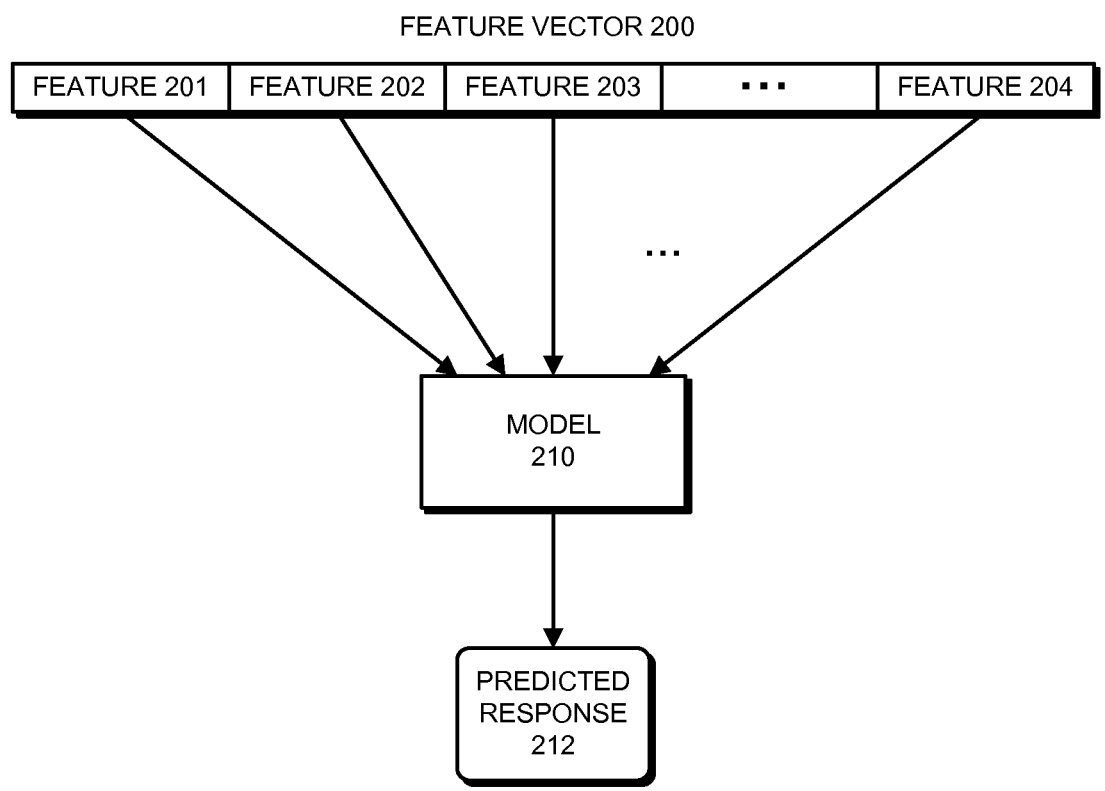
FIG. 2 illustrates how a model operates on a feature vector to produce a response in accordance with the disclosed embodiments.

FIG. 2 illustrates how a decision-making model 210 operates on a feature vector 200 to produce a response in accordance with the disclosed embodiments. During operation, model 210 receives inputs from feature vector 200. These inputs include a number of individual features 201-204, which can include any type of information from the online professional network that can be used to produce a predicted response 212. For example, the features 201-204 can include information about a member of the professional network, such as the member's occupation, the member's experience, and the member's connections within the online professional network. Features 201-204 can also include information about the member's actions, such as a record of the pages the member has viewed, and a record of items the member has posted. Features 201-204 can additionally include information about an item in the online professional network, such as information about the occurrence of specific terms in a news article posted to the online professional network (and whether there is any overlap between terms in the news article and terms in the member's profile), or information about how frequently a specific page has been viewed by members of the online professional network.

Model 210 uses these features 201-204 to generate a predicted response 212. This predicted response 212 can be a Boolean value, for example representing whether a specific comment posted by a member of the online professional network is spam. Predicted response 212 can also be a numerical value, for example estimating how much subscription revenue the online professional network will make from a specific member.

Model 210 can generally be implemented and trained using any one of a large number of possible machine-learning techniques, including but not limited to: logistic regression, neural networks, decision-tree learning, association rule learning, genetic programming, inductive logic programming, support vector machines, cluster analysis, Bayesian networks, reinforcement learning, representation learning, similarity learning and sparse dictionary learning. Moreover, the system that trains these models has a modular structure that allows components for different machine-learning techniques to be used by the system.

A feature vector and its associated response are referred to as a "training example," wherein a training example can be used to train various models to make predictions for the online professional network as is described in more detail below with reference to the flow charts in FIGS. 3-5.

Collecting Training Events

Figures 3, 4:
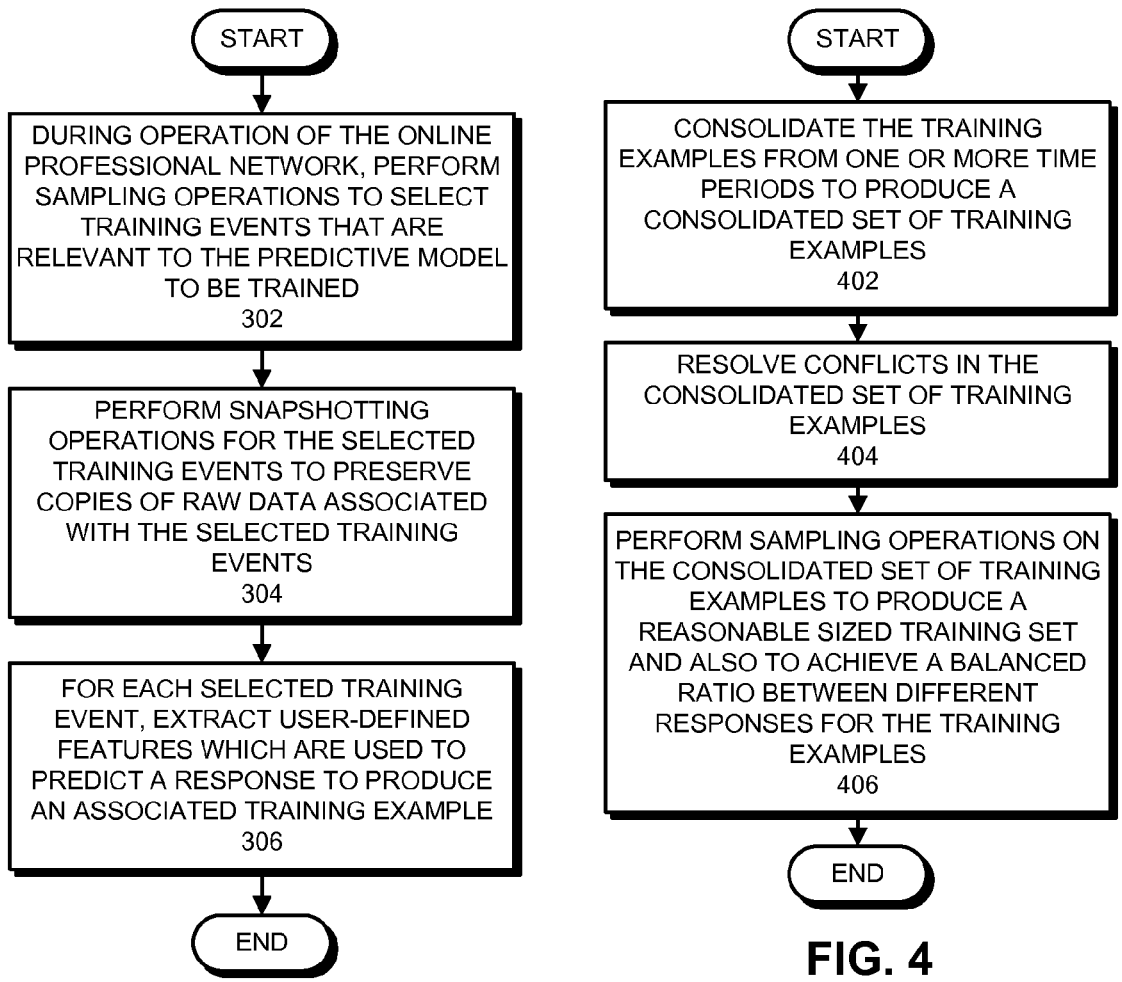
FIG. 3 presents a flow chart illustrating how training events are collected from an online professional network in accordance with the disclosed embodiments.
FIG. 4 presents a flow chart illustrating how training examples are consolidated in accordance with the disclosed embodiments.

FIG. 3 presents a flow chart illustrating how training events are collected from the online professional network in accordance with the disclosed embodiments. First, the system performs sampling operations to select training events that are relevant to the predictive model to be trained (step 302). This sampling process can be purely random; for example, the system can randomly select 10% of the possible training events. The sampling process can also be selective; for example, the system can be configured to only select training events associated with premium members.

Next, the system performs snapshotting operations for the selected training events to preserve copies of raw data with subjects (e.g., member, article, job, etc.) from the selected training events, wherein the copies are referred to as "snapshots" (step 304). Note that the system can possibly remove all personal identifiable information from each snapshot to protect the privacy of members of the online social network.

These snapshots can be quite useful, because if a user subsequently wants to experiment with using new features or signals with a model, it is hard to do so if the features are not preserved. There also exist cases where a training event is associated with a time period instead of a single point in time. For these cases, the system can create snapshots of entity data at the beginning of the time period to be used later.

Finally, for each selected training event, the system extracts user-defined features that are used to predict a response for the training event to produce a training example (step 306). Before the training events are collected, the system enables a user to define the training examples by identifying responses to be predicted and also the features that are used to predict the responses. For example, suppose a user wants to define a training example to predict whether a member will click on a news article based on the member's occupation and educational background. In this case, the features will include the member's occupation and the member's education (degrees obtained), and the response will indicate whether the member clicked on the news article.

Consolidating Training Examples

FIG. 4 presents a flow chart illustrating how training examples can be consolidated in accordance with the disclosed embodiments. First, the system consolidates the training examples from one or more time periods to produce a consolidated set of training examples (step 402). This step is useful because the training examples may be collected frequently, for example on a daily basis, or the training examples may be consolidated for training less frequently, for example on a weekly or monthly basis. Next, the system resolves conflicts in the consolidated set of training examples (step 404). For example, if a member clicks on a news article one day and the member ignores the news article the next day, this is a conflict, which the system can resolve by applying one or more predetermined rules. Finally, the system can perform additional sampling operations on the consolidated set of training examples to create a reasonable sized training set and also to achieve a balanced ratio among different responses for the training examples (step 406). For, example it may be desirable for the system to maintain a balanced ratio between positive and negative results in the set of training examples.

Training and Evaluating Models

Figure 5:
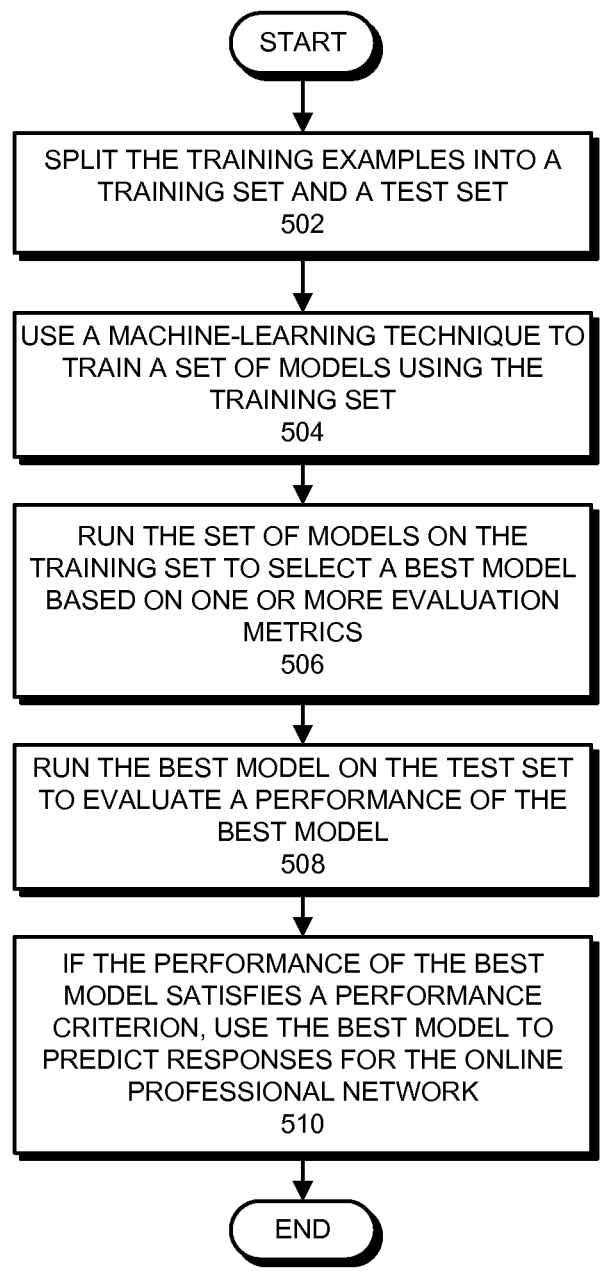
FIG. 5 presents a flow chart illustrating how models are trained and evaluated in accordance with the disclosed embodiments.

FIG. 5 presents a flow chart illustrating how models are trained and evaluated in accordance with the disclosed embodiments. First, the system splits the training examples into a training set and a test set (step 502). Next, the system uses a machine-learning technique to train a set of models using the training set (step 504). As mentioned above, a large number of possible machine-learning techniques can be used to train the models.

The system then runs the set of models on the training set and selects a best model based on one or more evaluation metrics (step 506). For example, the system can select the best model based on the accuracy of prediction.

After a best model is selected, the system runs the best model on the test set and evaluates the performance of the best model (step 508). Finally, if the performance of the best model satisfies a performance criterion, the system can use the best model to predict responses for the online social network (step 510).

EXAMPLES

In one example, the model determines a recruiting intent for a normal member of an online professional network. For example, a normal member of the online professional network (who is not a professional recruiter) may become interested in hiring an employee, in which case the member's intent becomes focused on recruiting. In this case, the online professional network can infer this change in intent from the member's actions and can provide a different view to the member to facilitate the recruiting process. The online professional network can also recommend a recruiting product to the member.

Note that a normal member who has recruiting intent is likely to perform certain actions. For example, the member may browse through a large number of member profiles and may perform keyword searches using terms such as "programmer;" the member may also post listings for jobs. Hence, to detect recruiting intent, the system can define features to be: the number of profiles the member has looked at recently; the number of searches the user has performed using hiring-oriented keywords; and the number of jobs a member has posted. The system can sample a set of active recruiters as members with strong recruiting intent and sample a set of members as members without recruiting intent. Next, the system can use a machine-learning technique to establish correlations between these features and a member's recruiting intent. At a later time, the normal member may hire an employee, in which case the member's behavior and inferred intent will change.

Another example relates to determining whether an article is spam. In this case, the system can use a crowd-sourcing technique, which asks a number of crowdsourcing workers to specify which articles in a collection of articles are spam. Next, the system can define features associated with the contents of the articles. The system can then use a machine-learning technique to determine correlations between the features and articles that are labeled as spam.

Another example is the problem of determining the lifetime value of a subscriber to the online professional network. This can be accomplished by taking training examples from historical data. More specifically, the system can define features associated with profiles of subscribers and can look into historical data to determine how long their subscriptions lasted and how much revenue was obtained from each subscriber. Next, if a subscriber converts on a specific subscription plan, the system can apply machine-learning techniques to determine how much total dollar booking value the system will likely obtain from the subscriber.

The foregoing descriptions of disclosed embodiments have been presented only for purposes of illustration and description. They are not intended to be exhaustive or to limit the disclosed embodiments to the forms disclosed. Accordingly, many modifications and variations will be apparent to practitioners skilled in the art. Additionally, the above disclosure is not intended to limit the disclosed embodiments. The scope of the disclosed embodiments is defined by the appended claims.

What is claimed is:

1. A computer-implemented method for facilitating an automatic machine-learning process for an online social network, the method comprising:
   during operation of the online social network, automatically collecting labeled training events;
   snapshotting raw entity data associated with subjects from the collected training events;
   generating features for each training event using the snapshotted entity data and the current entity data to produce training examples;
   consolidating the training examples from one or more time periods to produce a consolidated set of training examples;
   determining one or more contradictory user actions upon a set of entity data in the consolidated set of training examples, wherein a contradictory user action involves a same user responding differently to the same entity data over different time intervals;
   resolving the contradictory user actions for the consolidated set of training examples;
   splitting the training examples into a training set and a test set;
   using a machine-learning technique to train a set of models and select the best model based on one or more evaluation metrics using the training set;
   evaluating the performance of the best model on the test set; and
   if the performance of the best model satisfies a performance criterion, using the best model to predict responses for the online social network.

2. The computer-implemented method of claim 1, further comprising repeating the method to continually update a model that predicts responses for the online social network.

3. The computer-implemented method of claim 1, wherein automatically collecting the labeled training events includes performing sampling operations to select training events for a response to be predicted.

4. The computer-implemented method of claim 1, wherein before the training examples are split, the method further comprises:
   performing sampling operations on the consolidated set of training examples to achieve a balanced ratio among different responses for the training examples.

5. The computer-implemented method of claim 1,
   wherein evaluating the best model involves using quantitative and qualitative measures; and
   wherein using a qualitative measure includes using a crowd-sourcing evaluation technique that comprises:
   sending a selected set of training examples and associated responses that were produced by the best model to a crowd-sourcing module that solicits the opinions of an additional set of users about the accuracy of the responses; and
   comparing the predictions of the best model with predictions of the additional set of users on the selected training examples.

6. The computer-implemented method of claim 1, wherein the response to be predicted is associated with one or more of:
   a classification of an item;
   a prediction of a user preference; and
   a prediction of a user action.

7. The computer-implemented method of claim 1, wherein the user-defined features are associated with one or more of:
   information from a member's profile;
   a member's actions; and
   information about an item.

8. The computer-implemented method of claim 1, wherein the online social network is an online professional network.

9. A non-transitory computer-readable storage medium storing instructions that when executed by a computer cause the computer to perform a method for facilitating an automatic machine-learning process for an online social network, the method comprising:
   during operation of the online social network, automatically collecting labeled training events;
   snapshotting raw entity data associated with subjects from the collected training events;
   generating features for each training event using the snapshotted entity data and the current entity data to produce training examples;
   consolidating the training examples from one or more time periods to produce a consolidated set of training examples;
   determining one or more contradictory user actions upon a set of entity data in the consolidated set of training examples, wherein a contradictory user action involves a same user responding differently to the same entity data over different time intervals;
   resolving the contradictory user actions for the consolidated set of training examples;
   splitting the training examples into a training set and a test set;

using a machine-learning technique to train a set of models and select the best model based on one or more evaluation metrics using the training set;

evaluating the performance of the best model on the test set; and if the performance of the best model satisfies a performance criterion, using the best model to predict responses for the online social network.

10. The non-transitory computer-readable storage medium of claim 9, further comprising repeating the method to continually update a model that predicts responses for the online social network.

11. The non-transitory computer-readable storage medium of claim 9, wherein automatically collecting labeled training events includes performing sampling operations to select training events for a response to be predicted.

12. The non-transitory computer-readable storage medium of claim 9, wherein before the training examples are split, the method further comprises:

performing sampling operations on the consolidated set of training examples to achieve a balanced ratio among different responses for the training examples.

13. The non-transitory computer-readable storage medium of claim 9, wherein evaluating the best model involves using quantitative and qualitative measures; and wherein using a qualitative measure includes using a crowd-sourcing evaluation technique that comprises:

sending a selected set of training examples and associated responses that were produced by the best model to a crowd-sourcing module that solicits the opinions of an additional set of users about the accuracy of the responses; and comparing the predictions of the best model with predictions of the additional set of users on the selected training examples.

14. The non-transitory computer-readable storage medium of claim 9, wherein the response to be predicted is associated with one or more of:

a classification of an item;

a prediction of a user preference; and a prediction of a user action.

15. The non-transitory computer-readable storage medium of claim 9, wherein the user-defined features are associated with one or more of:

information from a member's profile;

a member's actions; and information about an item.

16. The non-transitory computer-readable storage medium of claim 9, wherein the online social network is an online professional network.

17. A system that facilitates an automatic machine-learning process for an online social network, comprising:

a computing system including a processor and a memory;

wherein the computing system is configured to run an online social network; and wherein the online social network is configured to, automatically collect labeled training events;

snapshot raw entity data associated with subjects from the collected training events;

generate features for each training event using the snapshotted entity data and the current entity data to produce training examples;

consolidate the training examples from one or more time periods to produce a consolidated set of training examples;

determine one or more contradictory user actions upon a set of entity data in the consolidated set of training examples, wherein a contradictory user action involves a same user responding differently to the same entity data over different time intervals;

resolve the contradictory user actions for the consolidated set of training examples;

split the training examples into a training set and a test set;

use a machine-learning technique to train a set of models and select the best model based on one or more evaluation metrics using the training set;

evaluate the performance of the best model on the test set; and if the performance of the best model satisfies a performance criterion, use the best model to predict responses for the online social network.

18. The system of claim 17, wherein the online social network is configured to repeat the process of collecting, splitting, training, selecting and evaluating to continually update a model that predicts responses for the online social network.

19. The system of claim 17, wherein while collecting labeled training events, the online social network is configured to perform sampling operations to select training events for the response to be predicted.

20. The system of claim 17, wherein before the training examples are split, the system is configured to:

perform sampling operations on the consolidated set of training examples to achieve a balanced ratio among different responses for the training examples.

21. The system of claim 17, wherein while evaluating the best model the online social network is configured to use quantitative and qualitative measures; and wherein using a qualitative measure includes using a crowd-sourcing evaluation technique that comprises:

sending a selected set of training examples and associated responses that were produced by the best model to a crowd-sourcing module that solicits the opinions of an additional set of users about the accuracy of the responses; and comparing the predictions of the best model with predictions of the additional set of users on the selected training examples.

22. The system of claim 17, wherein the response to be predicted is associated with one or more of:

a classification of an item;

a prediction of a user preference; and a prediction of a user action.

23. The system of claim 17, wherein the user-defined features are associated with one or more of:

information from a member's profile;

a member's actions; and information about an item.

* * * * *